Nov. 14, 1944.                G. W. SCHULTZ                    2,362,668
                           DUMP TRUCK BODY SUPPORT
                             Filed May 25, 1943
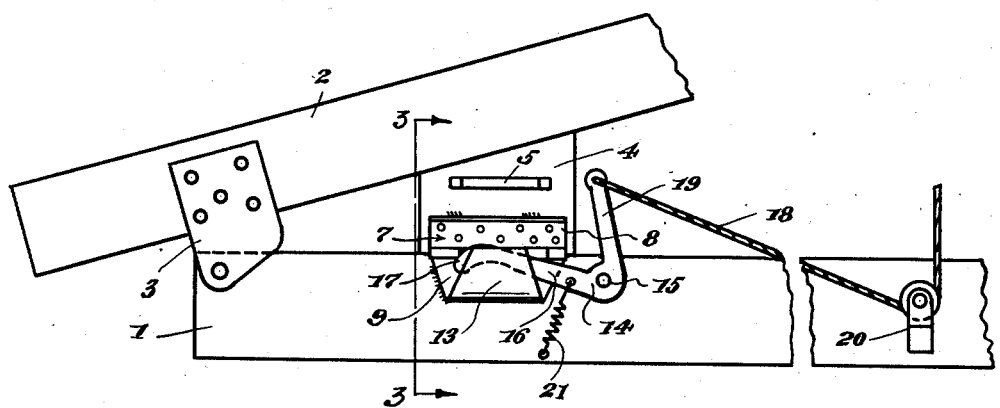
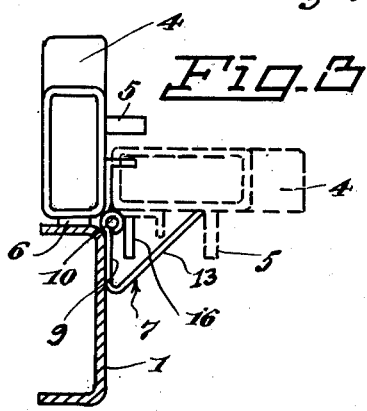
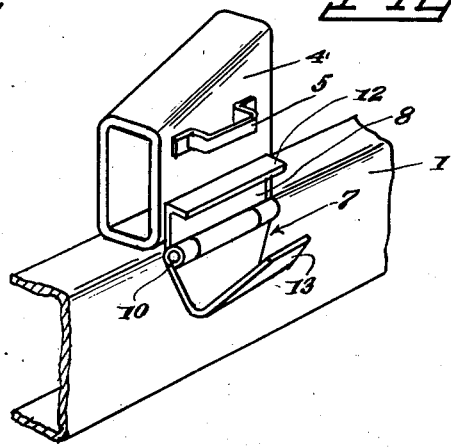
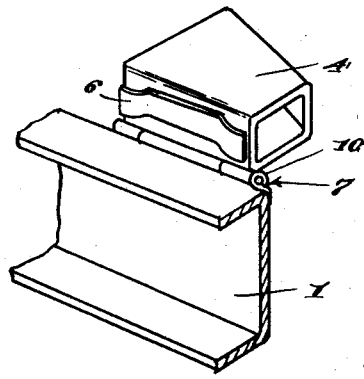
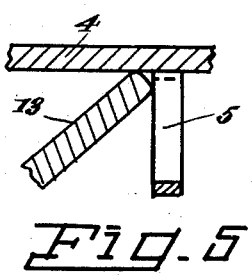
Inventor
George W. Schultz
By Glenn L. Fish
Attorney Patented Nov. 14, 1944

2,362,668

UNITED STATES PATENT OFFICE 2,362,668

DUMP TRUCK BODY SUPPORT

George W. Schultz, Spokane, Wash.

Application May 25, 1943, Serial No. 488,410

5 Claims. (Cl. 298—17)

This invention relates to a dump body support and it is one object of the invention to provide a support by means of which a dump body of a truck may be supported when raised to dumping position and thus prevented from accidentally dropping while the truck body is raised and injuring a person working upon mechanism under the truck body.

Another object of the invention is to provide a device for holding the truck body in raised position consisting of a block pivotally connected with the truck frame in such position that it may be swung into and out of position for use over a chassis bar of the frame.

Another object of the invention is to provide a supporting block mounted for swinging movement into and out of position for use through the medium of a hinge bracket having one leaf fixed to the block and its other leaf welded or otherwise secured to the chassis bar of the frame, the frame-engaging leaf being bent to provide a tongue or arm for engaging under and supporting the block when the block is swung out of operative position over the chassis bar.

Another object of the invention is to provide the block with a handle for swinging it into and out of position for use, the handle being so located upon the block that when the block is swung downwardly to lowered inoperative position upon the tongue of the supporting bracket, the tongue has wedging engagement with the handle and frictionally prevents the block from vibrating and making rattling noises.

Another object of the invention is to provide the block-engaging leaf of the hinge bracket with a flange or lip for engagement by a bell-crank lever pivoted to the chassis bar, whereby the block may be mechanically swung to its position for use when mechanism of which the bell-crank forms a part is actuated to raise the block.

Another object of the invention is to provide a device of this character which is simple in construction and capable of being applied to trucks of conventional construction.

In the accompanying drawing:

Fig. 1 is a view in side elevation showing a support of the improved construction carried by a chassis bar of a dump truck and engaged under the body of the truck.

Fig. 2 is a perspective view showing the block and its hinge bracket carried by a portion of a chassis body.

Fig. 3 is a view showing the chassis bar in transverse section on the line 3—3 of Fig. 1, and the support in end elevation, the block being shown in position for use upon the chassis bar and its inoperative or lowered position being indicated by dotted lines.

Fig. 4 is a perspective view showing the block swung downwardly to inoperative position.

Fig. 5 is a fragmentary sectional view illustrating the manner in which the tongue of the bracket engages back of the handle to frictionally hold the block in lowered position.

This supporting device is an attachment for dump trucks and while one has been shown in the drawing at a side of the truck, it is to be understood that two may be used and mounted at opposite sides of the chassis.

The frame or chassis is of conventional construction and is provided at opposite sides with the usual chassis bars 1, one of which is shown in the drawing. The body is disposed over the chassis and its frame has the usual side bars 2 which carry depending brackets 3 pivoted to the chassis bars to mount the body for vertical tilting from a lowered position on the chassis to raised position for dumping a load.

The block 4, by means of which the body is supported in the dumping position, is formed of strong sheet metal and is tubular so that it will be of light weight but very strong and capable of supporting a heavy load. At one side, the block carries a handle 5 by means of which it may be swung from lowered position to raised position over the chassis bar by a person standing on the ground. A leaf spring 6 is welded to the lower wall of the block with its end portions free and extending downwardly at an incline for engaging the block in the operative position shown in Fig. 3. Therefore, the spring may act as a shock absorber and prevent the block from being damaged as the truck body comes to rest thereon. The upper wall of the block extends diagonally of its lower wall and, therefore, when the block is resting flat upon the chassis bar in position for use, the upper wall will extend at such an angle that the under face of the side bar of the body may rest flat upon the upper face of the block, as shown in Fig. 1.

To mount the block for swinging movement into and out of position for use, there has been provided a hinge bracket 7 having leaves 8 and 9 formed with sleeves through which a pintle 10 passes to pivotally connect the leaves. The leaf 8 is secured against the side wall of the block by rivets or by welding, as shown in Figures 1 and 2, and has its upper end portion bent to form an outstanding lip or flange 12 projecting laterally from the block, as shown in Figs. 2 and 3. The other leaf 9 of the bracket is welded or otherwise secured against the side face of the chassis bar, and has its lower portion bent outwardly and upwardly to form a tongue 13 which is resilient and constitutes a support for the block when the block is swung downwardly to the inoperative position shown in Fig. 4 and indicated by dotted lines in Fig. 3. Referring to this figure and Fig. 5, it will be seen that when the block is swung downwardly onto the upper end of the tongue 13, the free end of the tongue has wedging engagement with the handle 5 and frictional grip is created which will prevent the block from vibrating and creating a rattling noise when the truck is in motion.

When the support is in use, it is to be swung into position to rest upon the upper face of the chassis bar, after the truck body has been raised and the truck body is then lowered until it rests on the block. It will thus be impossible for the truck body to return to completely lowered position and a person can lean over a side of the chassis to make adjustments or repairs under the body without danger of being injured by the body accidentally dropping with crushing force. After repairs or adjustments are made, the truck body is raised slightly and the block then swung downwardly to the lowered or inoperative position where it rests upon the tongue 13 and will be out of the way.

Swinging of the block to either raised or lowered position may be accomplished by means of the handle, or it may be swung upwardly by mechanism including the bell-crank lever 14 which is pivoted to the chassis bar by the pivot fastener 15. This bell-crank has its arm 16 extending longitudinally of the chassis bar and has its free end portion curved longitudinally to form a cam 17 and from an inspection of Figs. 1 and 3, it will be readily seen that when the bell-crank is turned about the pivot by pull upon the cable 18 attached to the upper arm 19 of the bell-crank, upward lift will be imparted to the block and said block will be swung into place over the chassis bar. The cable is trained about one or more guides such as the pulley 20, to a position in which it may be grasped by a person in the driver's cab of the truck, or attached to a lever or the like, to be actuated by the driver. When pull upon the cable is relieved, the spring 21 swings the bell-crank to its normal position and the block may swing downwardly to lowered position when the truck body is raised out of position at rest upon the block. Since the weight of the truck body compresses the leaf spring 6, upward thrust will be imparted to the block when the truck body is raised and the block and leaf 8 of the hinge bracket will be impelled outwardly and downwardly and come to rest upon the tongue 13 with the free end of the tongue in frictional gripping engagement with the handle 5. The block will thus be returned to lowered position where it will remain until again needed.

Having thus described the invention, what is claimed is:

1. In combination with a vehicle including a chassis bar and a dump body mounted over the chassis for vertical swinging movement from lowered position upon the chassis to raised position for dumping; means for supporting the body in raised position comprising a block, a hinge bracket having leaves pivotally connected, one leaf of said bracket being fixed to the block and the other leaf being mounted against the chassis bar and having a portion bent upwardly to form a tongue for engaging under and supporting the block in lowered position, and a handle for said block projecting laterally therefrom in position for wedging engagement by the free end of said tongue to frictionally hold the block in lowered position.

2. In combination with a vehicle including a chassis bar and a dump body mounted over the chassis for vertical swinging movement from lowered position upon the chassis to raised position for dumping; means for supporting the body in raised position comprising a block, a hinge bracket having leaves pivotally connected, one leaf of said bracket being fixed to the block and the other leaf being mounted against the chassis bar and having a tongue extending outwardly and upwardly from the chassis bar for engaging under and supporting the block in lowered position, the leaf fixed to said block having a portion bent outwardly to form a lip extending laterally from the block, and a member pivoted to said chassis with a portion extending longitudinally of the chassis bar between the tongue and the leaf carrying the tongue in position for engaging said lip as the member is turned about its pivot in one direction to swing the block upwardly into position over the chassis.

3. In combination with a vehicle including a chassis bar and a dump body pivotally mounted over the chassis for vertical swinging movement from lowered position on the chassis to raised position for dumping; means for supporting the body in raised position comprising a block, a hinge bracket having leaves pivotally connected, one leaf of said bracket being fixed to the block and the other leaf being mounted against the chassis bar, a tongue for supporting the block in a substantially horizontal lowered position, and a spring compressed between the block and the chassis bar by weight of the body when resting upon the block and serving to urge the block toward its lowered position.

4. In combination with a vehicle including a chassis bar and a dump body mounted over the chassis for vertical swinging movement from lowered position upon the chassis to raised position for dumping; means for supporting the body in raised position comprising a block, a hinge bracket having leaves pivotally connected, one leaf of said bracket being fixed to the block and the other leaf being mounted against the chassis bar, and a tongue carried by the leaf fixed to said chassis bar and extending outwardly therefrom in position for supporting the block in a substantially horizontal lowered position.

5. In combination with a vehicle including a chassis bar and a dump body mounted over the chassis for vertical swinging movement from lowered position upon the chassis to raised position for dumping; means for supporting the body in raised position comprising a block, a hinge bracket having leaves pivotally connected, one leaf of said bracket being fixed to the block and the other leaf being mounted against the chassis bar, a tongue carried by the leaf fixed to said chassis bar for supporting the block in lowered position, and a spring mounted against the bottom of said block for engaging the chassis bar, said spring being tensioned by the weight of the body resting on said block and tending to swing the block outwardly and downwardly toward its lowered position when the body is raised to remove its weight from the block.

GEORGE W. SCHULTZ.